US012729667B2

(12) United States Patent
Hambrecht

(10) Patent No.: US 12,729,667 B2
(45) Date of Patent: Sep. 8, 2026

(54) DRIVE TRAIN MOUNTING ASSEMBLY WITH A TORQUE SUPPORT, AND INDUSTRIAL TRANSMISSION EQUIPPED THEREWITH, AND METHOD FOR ADJUSTING A DRIVE TRAIN MOUNTING ASSEMBLY AND USE

(71) Applicant: Flender GmbH, Bocholt (DE)

(72) Inventor: Ralf Hambrecht, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/842,689

(22) PCT Filed: Mar. 2, 2023

(86) PCT No.: PCT/EP2023/055250
§ 371 (c)(1),
(2) Date: Aug. 29, 2024

(87) PCT Pub. No.: WO2023/169909
PCT Pub. Date: Sep. 14, 2023

(65) Prior Publication Data

US 2025/0257719 A1 Aug. 14, 2025

(30) Foreign Application Priority Data

Mar. 9, 2022 (EP) .................................... 22160999

(51) Int. Cl.
*F03D 80/70* (2016.01)
*F03D 15/10* (2016.01)

(52) U.S. Cl.
CPC .......... *F03D 80/70* (2016.05); *F03D 15/101* (2023.08); *F05B 2260/964* (2013.01); *F05B 2260/966* (2013.01)

(58) Field of Classification Search
CPC ................ F03D 80/70; F05B 2260/964; F05B 2260/966
See application file for complete search history.

(56) References Cited

U.S. PATENT DOCUMENTS

2012/0076652 A1* 3/2012 Ventzke ................. F03D 15/00 416/61
2016/0061191 A1 3/2016 Wilson
(Continued)

FOREIGN PATENT DOCUMENTS

CN 102734090 A 10/2012
CN 102852739 A 1/2013
(Continued)

OTHER PUBLICATIONS

Chinese Search Report Issued on Dec. 14, 2024 with respect to counterpart Chinese patent application 202380026353.6.
(Continued)

*Primary Examiner* — Sean Gugger
(74) *Attorney, Agent, or Firm* — Henry M. Feiereisen LLC

(57) ABSTRACT

A drive train mounting assembly for an industrial transmission, in particular for a rotor with double mounting or momentum mounting of a wind power installation, includes a first housing, a shaft of a drive train, a mounting supported in the first housing and supporting the shaft, a second housing, a transmission component surrounded by the second housing and coupled to the shaft, and a torque support designed to counteract a gravity-induced torque which acts on the shaft by the transmission component. The torque support is fastened to the first housing and includes an adjustable unit.

15 Claims, 7 Drawing Sheets

(56) References Cited

U.S. PATENT DOCUMENTS

| | | | | |
|---|---|---|---|---|
| 2017/0321747 | A1* | 11/2017 | Ertas | F16C 17/26 |
| 2018/0328344 | A1* | 11/2018 | Rogg | F03D 80/70 |
| 2022/0299012 | A1* | 9/2022 | Muhamad | F03D 80/70 |

FOREIGN PATENT DOCUMENTS

| | | |
|---|---|---|
| CN | 113389697 | 9/2021 |
| DE | 10 2007 053 586 | 5/2009 |
| EP | 3 168 464 | 5/2017 |
| EP | 2 630 371 | 12/2018 |

OTHER PUBLICATIONS

Translation of Chinese Search Report issued on Dec. 14, 2024 with respect to counterpart Chinese patent application 202380026353.6.
International Search Report Issued on Jun. 5, 2023 by the European Patent Office in International Application PCT/EP2023/055250.

* cited by examiner 21
9
20
M1
g
16, 17
M2
18.9
17.9
17.7
17.5
X-X
19
F1
F3
F1
F2
13.5
17.5
17.7
13.7
13.9
18.1
13
10

DRIVE TRAIN MOUNTING ASSEMBLY WITH A TORQUE SUPPORT, AND INDUSTRIAL TRANSMISSION EQUIPPED THEREWITH, AND METHOD FOR ADJUSTING A DRIVE TRAIN MOUNTING ASSEMBLY AND USE

CROSS-REFERENCES TO RELATED APPLICATIONS

This application is the U.S. National Stage of International Application No. PCT/EP2023/055250, filed Mar. 2, 2023, which designated the United States and has been published as International Publication No. WO 2023/169909 A1 and which claims the priority of European Patent Application, Serial No. 22160999.3, filed Mar. 9, 2022, pursuant to 35 U.S.C. 119(a)-(d).

TECHNICAL FIELD

The invention relates to a drive train mounting assembly having a mounting for a shaft of the drive train, which mounting is supported in a first housing, and a transmission component which is surrounded by a second housing and coupled to the shaft, and a torque support, wherein the torque support counteracts at least one gravity-induced torque which acts on the shaft by means of the transmission component; the invention furthermore relates to a drive train and to an industrial transmission having a mounting of this type.

BACKGROUND TO THE INVENTION

In drive trains in which comparatively massive and large components are connected to one another, great forces act already due to gravity, which can also act on the drive train and on the corresponding bearing components in a highly dynamic manner. Depending on the dynamics and the load range, it can become necessary to support individual ones of the components in relation to gravity and/or secure them in relation to excessively dynamic load peaks. For example, the dynamic forces and torques are particularly salient in wind power installations, due to the operating and meteorological conditions which cannot be precisely predicted, and considerably stress the components designed for a long service life particularly in the case of offshore installations. To this extent, an improvement in terms of the hitherto existing conditions and possibilities for minimizing forces and torques that exert structural loads is desirable.

In some applications, special attention has also to be given to the so-called rotating bending moments. If the drive train is statically stressed on one side by great masses with a large leverage (for example in addition to the dynamic wind events), this leads to dynamic loading, or cyclical stress, on the rotating components such as, for example, the rotor shaft, a planet carrier in particular in a first gear stage and/or rotating connecting elements, for example in a flanged embodiment by a rotor of a wind power installation that is very large in terms of diameter and potentially also rotates at a rather disadvantageous frequency/rotation rate, and this can lead to very intense effects on the structure and the machine support and the entire assembly including bearings and any couplings. Therefore, there is great interest with a view to being able to minimize rotating bending moments of this type, in particular in the context of increasing installation outputs and component weights.

Until now, a correspondingly cost-intensive and material-intensive oversizing of the respective components has predominantly taken place, in particular based on comparatively high safety factors. Until now, supporting particularly heavy or massive components, or particularly cantilevered components, of the drive train has usually been performed in the direction of the machine support (base), in particular also in the region of a generator which is disposed behind a/the transmission component, i.e. farther away from the rotor (torque support unit, or weight support with coupling to the base).

Publication US 2016/061191 A1 describes a claw-type coupling for drive trains of wind power installations at the interface between a planet ring gear end side and a shaft flange which is supported in relation to a base, wherein vibration dampers are provided on the flanks of the claws.

Proceeding therefrom, there exists a requirement for optimized measures for the torque or weight support of drive train components, for example the gear stage and/or the generator, in particular also in drive trains for wind power installations.

SUMMARY OF THE INVENTION

It is the object of the present invention to demonstrate measures which enable an improved torque or weight support of comparatively massive heavy drive train components, in particular of the gear stage and/or the generator, in particular also in drive trains for wind power installations.

The object is achieved by a drive train mounting assembly, by an industrial transmission, and by a wind power installation having the features of the respective coordinate claim, and by a method according to the features of the coordinate method claim, and by uses according to the features of the coordinate use claim. Preferred design embodiments are set forth in the dependent claims and in the description hereunder, which can in each case represent an aspect of the invention individually or in combination with one another. Where a feature is illustrated in combination with another feature, this serves only to simply the visualization of the invention and is in no way intended to mean that this feature cannot be a refinement of the invention also without the other feature.

One aspect of the invention relates to a drive train mounting in the context of drive trains on which a dynamic and comparatively high torque, in particular also a tilting moment, acts. Provided to this extent is a drive train mounting assembly for industrial transmissions, in particular for a rotor with double mounting or momentum mounting of a wind power installation, having: a mounting (in particular with two axially offset bearing points) for a shaft of the drive train, which mounting is supported/able to be supported in a first housing, and a transmission component (in particular with a planetary gear stage) which is surrounded by a second housing and coupled to the shaft. It is proposed according to the invention to provide a torque support which counteracts a gravity-induced (tilting moment) torque which acts on the shaft by means of the transmission component (in particular a torque or a rotating bending resulting from a transmission/generator combination); wherein the torque support is fastened to the (first) housing of the mounting of the shaft. This enables a sizeable reduction of the static and dynamic loads exerted on the drive train, or on the co-rotationally connected components (shaft, transmission, potential couplings). For example, the rotating bending resulting from the weight of the generator/transmission combination can be noticeably reduced in wind power installations with a double-mounted rotor shaft, or a so-called momentum mounting, and a transmission and generator linked thereto. Advantages are also derived in terms of construction, in particular relating to the requirements of a/the machine support in terms of stiffness and size.

The weight of the transmission and of a generator potentially flanged to the transmission housing usually stress the rotor shaft, the rotor bearings, the transmission components (in particular also a planetary carrier of a first gear stage and the planet carrier bearing thereof), and potential flanged connections between the transmission and the generator. In the process, so-called rotating bending is created in the rotating elements, which has to be taken into account when sizing or designing the overall construction. Against this background, the present invention makes it possible to significantly reduce the rotating bending stress and at the same time to reduce tilting in the transmission, in particular in a/the first planetary gear stage. As a result, a better supporting behavior of the toothings of the transmission can also be achieved. To this extent, the reduction in the structural stress achievable according to the invention can also be associated with reduced wear.

The present invention also enables an optimized reflux of force with comparatively minor negative effects resulting from different deformations in/on the machine support and in/on the transmission, in particular by virtue of the transmission torque as well as leverage weight forces being supported by means of the torque support by way of the rotor bearing housing. For example in wind power installations, the pitching effects resulting from wind loads that act on the rotor and the rotor shaft can also be absorbed in an optimized way when the alignment of the shaft and of potential further components of the drive train is at least slightly altered, for example by a slightly tilting rotor; in particular, these pitching effects no longer have to be dissipated by way of the machine support, as hitherto, so that also no additional loads have to be received in the support structure. Instead, the present invention to this extent also enables an at least small motion tolerance, depending on the type of support on the first housing. The present invention can be advantageously implemented in different types of drive trains, in particular in the case of comparatively great pitching effects. Purely by way of example, a drive train with plug-on planetary gears, in particular in roller presses, can be mentioned as a further potential application.

In transmissions to date, supporting was usually performed downward in the direction of the base/machine support. Previously, rotating bending moments and pitching effects that arose were often also absorbed based on oversizing of the affected machine elements (in particular rotor shaft, rotor bearing, gear stage comprising, for example, planet carrier, planet carrier bearing, and transmission and generator housing flanges). However, a considerable disadvantage in terms of cost and weight is created in this approach, and the weight disadvantage can also have a highly disadvantageous effect on further components of the installation for example in wind power installations such as, for example, also the tower of a wind power installation which in this instance has to be designed for a correspondingly higher load-bearing capability. In order to better meet these requirements, a weight support has hitherto also already been used between the generator and the machine support. However, one advantage herein lies in that the support structure below the generator is usually not designed for this, and additional excessive loads can be created in a rapid pitching movement of the drive train; not least, flanged connections between the transmission and the generator are additionally stressed as a result.

However, according to the invention the concept that the force flux can also be absorbed and dissipated by way of the rotor bearing housing is utilized; the gear stage with the generator can optionally also be cantilevered, i.e. "free-floating" (in particular so as to be fixed at only one end, while the other end protrudes freely and requires no additional support) similar to a free end of the drive train having a certain degree of motion tolerance, thus can/could carry out a predefined maximum value of a pitching movement, also conjointly with the rotor or the shaft; a considerable degree of freedom of movement can optionally be ensured in a plurality of spatial directions as a result, depending on the application and the desired or required stiffness of the drive train; depending on the desired stiffness herein, the support on the rotor bearing housing can be designed individually also in terms of individual directions of movement, for example in terms of a value of a motion tolerance, in terms of pre-tensioning, damping (in particular by means of elastomer mountings) or the like. Vibration decoupling can also take place herein, in particular at the interface between the first and the second housing. The invention also enables a very sustainable and materially efficient manner of mounting, which is also suitable for a slim type of construction optimized for weight, not least in the context of highly dynamic external influences, for example in wind power installations (wind/weather; rotor blade adjustment, or the like changes in the system/operating state).

The torque support herein can have, for example, one or a plurality of supports which are distributed over the rotor bearing housing circumference, in particular on individual circumferential portions. The type of the particularly advantageous support in the respective individual case can be chosen by the person skilled in the art as a function of the further components of the respective drive train, in particular also based on the present disclosure.

"Axial" hereunder is to be understood to mean in particular an alignment according to the extent of the shaft, or of a further component of the drive train that is coupled thereto so as be axially co-aligned, wherein an "axial" alignment may also be at least approximately a horizontal alignment, depending on the inclination of the drive train, in particular in an extent between the rotor or the hub, on the one hand, and a transmission component or generator, on the other hand. According to one design embodiment, the drive train described herein is delimited by the rotor on the one side, and by the transmission component or a/the generator (optionally coupled directly to the transmission), on the other side.

If mention is made of a "rotor mounting", reference may also be synonymously made to other shaft mountings; the term "rotor mounting" herein is chosen in order to visualize that the mounting takes place in that portion of the shaft in which the forces and torques exerted on the shaft by a rotor are supported. The rotor mounting is sized so as to be comparatively robust and strong and voluminous in wind power installations, for example, in particular because the rotor can have a diameter of many meters (even more than 100 m or even 200 m), and thus be the cause of very high stresses/torques.

Personified terms, unless worded in the neutral, can relate to all genders in the context of the present disclosure. Any English terms or abbreviations used herein are in each case customary technical terms and are well known to the person skilled in the art fluent in English. Any German terms which are used/able to be used synonymously may be stated (in brackets) for the sake of completeness, or vice versa.

If the vertical direction or a direction of gravity is used according to the present disclosure, this direction (depending on the inclination of the shaft or of a/the rotor) is aligned at an angle of at least approximately 90° in relation to the axial direction of the drive train, or the intended installed position of the latter (centerlines, or the rotation axis of the respective transmission component, or of the output shaft, in the horizontal direction or slightly inclined in relation to the latter).

If a planetary gear is mentioned according to the present disclosure, this may refer to planetary gear stages in general, as well as to planetary spur gears.

A tilting moment according to the present disclosure is to be understood to mean a moment which results from the transmission of weight and potentially additionally also from the generator weight multiplied by the lever arm to the bearing/rotation point on the planetary carrier bearing, or at an interface between the transmission and the rotor shaft (and corresponding dynamic loads which additionally occurred during operation).

It has been demonstrated that the present invention, in particular in conjunction with installed planetary gears, or planetary gear stages, is useful, in particular when also a generator is installed so as to be co-aligned on one axis with the transmission. Nevertheless, the advantages described herein can also be implemented for drive trains having other or additional transmission types/stages.

According to one exemplary embodiment, the at least one adjustable unit on at least one circumferential position pairing, in particular at 6 and 12 o'clock and/or at 3 and 9 o'clock, generates a first force pair F1 which is substantially axially aligned about the axial center of the drive train, in particular a force pair F1 that is directed counter to tilting and/or yawing moments.

According to one exemplary embodiment, the at least one adjustable unit on at least one circumferential position pairing, in particular at 3 and 9 o'clock and/or at 6 and 12 o'clock, generates a second torque-generating force pair F2 which is substantially radially/tangentially aligned and acts orthogonally in relation to the axial center of the drive train, in particular a force pair F2 that is directed counter to torques about the shaft. In other words: the at least one adjustable unit is disposed on at least one circumferential position pairing so as to generate a counteracting torque about the corresponding spatial axis.

According to one exemplary embodiment, the at least one adjustable unit on at least two mutually opposite circumferential positions ensures vibration damping or vibration decoupling between interacting coupling parts in at least one coupling portion, in particular by means of at least one pre-tensioning unit per circumferential position.

According to one exemplary embodiment, the at least one adjustable unit on at least two mutually opposite predefined circumferential positions, in particular at least on the circumferential positions 6 and 12 o'clock and/or at 3 and 9 o'clock, is installed there so as to act in each case in a resilient and/or damping manner between traction members or traction members/compression tappet of the transmission housing and of the rotor bearing housing. The respective mutually opposite circumferential positions herein can also be selected as the function of predominantly prevailing loading states and be scaled in terms of number and size, for example.

According to one exemplary embodiment, the drive train mounting assembly comprises a plurality of adjustable units by means of which reactive force pairs acting about all three momentum axes, or acting three-dimensionally about all three spatial directions, are provided and optionally also actively adjusted. This also offers particularly effective damping.

According to one exemplary embodiment, the torque support is supported exclusively on the first housing, or on the housing of the mounting of the shaft, independently of any connection to a machine support or similar base disposed below the drive train or below the drive train mounting assembly. This also enables a motion tolerance without the machine support having to provided over a comparatively large axial length and/or in a comparatively robust design.

According to one exemplary embodiment, the torque support is supported on the (first) housing of the bearing of the shaft in support points/regions disposed along an outer connection diameter between the first and the second housing, in particular in at least four circumferential portions or fully circumferentially on the first housing, in particular in the case of a rotationally symmetrical distribution of the support points/regions across the entire circumference. This not least enables an optimization in terms of the transmission of forces and torques in a manner largely independent of their direction of action.

According to one exemplary embodiment, the first and/or the second housing provide/provides at least partially at least one coupling partner (claw, cam, tappet, web or similar appendage, in particular also in the radial and/or in the tangential direction, or in the circumferential direction) for the mutual support of the housing on one another, in particular in an integral design embodiment in one piece at an external shell face of the respective housing. This offers not least also good robustness. In the case of a uniform distribution of the coupling partners (elements) in the circumferential direction, supporting can also be ensured largely independently of any momentary direction of action of a force/torque.

The torque support has at least one adjustable unit, in particular a unit which is adjustable in terms of force (value) and/or direction of action and/or force-engagement point/region. This facilitates not least also a customization in terms of the type of support, for example also with a view to feedback-control as a function of an operating state.

The adjustable unit can be adjustable, for example, in terms of a pre-tensioning force (in particular spring force or hydraulic force), and/or in terms of an active control force (counterforce) as a response to momentary forces and torques detected by sensors. A corresponding sensor system is provided, for example, in the region of the respective interface on end-side and/or radial contact faces. To this extent, the present invention also offers a concept for actively applying a force in particular in response to forces/torques momentarily acting on the drive train, for example as a function of momentarily prevailing wind/meteorological conditions in the case of offshore wind power installations.

According to one exemplary embodiment, the torque support, in particular a/the at least one adjustable unit of the torque support, is provided in an upper region and/or in a lower region of an interface between the housings. An arrangement of this type also offers the advantage that the erection force and/or supporting force can in each case be applied in a targeted manner on specific circumferential portions. In terms of the erection force described herein, due to the associated advantageous lever arm, a force-engagement point is provided at the bottom and the top on the corresponding connection diameter on the housing, or even farther radially outside on lugs or tappets or similar lever elements specially provided therefor.

For example, the transmission of force in terms of the desired erection force is performed (substantially horizontally) in a circumferential angular range of at least two times at least 30° and/or in combination with a potentially desired supporting force, or possibly a supporting force which is intended to be only very local, (substantially vertically) in a circumferential angular range of at least four times 20°. Depending on the number and the design of the force-transmitting portions, a shorter or narrower element may already be sufficient, for example in a circumferential segment across an angle of only 10°.

According to one exemplary embodiment, the torque support, in particular the at least one adjustable unit, is diagonally connected, in particular in such a manner that a hydraulic or mechanical compensation is relatively soft(er) in the axial direction and relatively stiff(er) in the tilting direction. This not least also facilitates a positive compromise consisting of effective support and potentially desired positional tolerance compensation, in particular in conjunction with manufacturing tolerances, rotor bearing play, or rotor bearing resilience in the axial direction.

The at least one adjustable unit, or at least one adjustable element thereof, can be diagonally connected in such a manner that a hydraulic or mechanical compensation is relatively soft(er) in the axial direction of the rotation axis and relatively stiff(er) in the tilting direction, in particular in such a manner that a hydraulic or mechanical compensation in the tilting direction is carried out in a soft(er) or stiff(er) manner, or with higher or lower vibration damping, as a function of the direction. This also offers an advantageous operating behavior.

The torque support can in particular be hydraulically and/or mechanically supported in a circumferential angular range of at least two times at least 30°, and/or in a circumferential angular range of at least four times 20°, in such a manner that a hydraulic or mechanical compensation is relatively soft(er) in the axial direction of the rotation axis and relatively stiff(er) in the circumferential direction, in particular in such a manner that a hydraulic or mechanical compensation in the circumferential direction is carried out in the soft(er) or stiff(er) manner, or with higher or lower vibration damping, as a function of the direction.

The present invention enables a plurality of measures which can be combined with one another not only relating to a tilting moment support, but also a torque support. The latter acts in the circumferential direction and can be required as a function of the output, or be adjusted/feedback-controlled as a function of the output. The tilting moment support counteracts the weight in the tilting direction, thus can also be described as a counteracting force or restoring force with a vertical force component.

According to one exemplary embodiment, a radially projecting flange or similar force-engagement collar or segment, which is delimited or encompassed, for example delimited in an annular manner in the fashion of an annular shell which is C-shaped in the cross section, or a plurality of (semi-) shell elements, on at least one axial position (in particular so as to be mutually opposite on both axial sides) by the torque support, in particular by the at least one adjustable unit, is provided on the (second) housing of the transmission component. As a result, a very robust assembly having a certain angular tolerance and, for example, an integrated damping function, can be provided in an advantageous manner.

For example, the respective force-engagement point/region can also be provided so as to be integral on the respective housing component, for example be integrally cast in the case of cast metal housings, thus already be taken into account in the context of the construction and the basic design. Alternatively (for example if no cast metal housing is used) or additionally, a reversible form-fitting/force-fitting type of connection, for example a threaded connection, can optionally also be provided. This is useful, for example, in the context of a modification or retrofit option in existing transmissions, or on already installed drive trains, whereby a materially integral fastening may also be performed.

According to one exemplary embodiment, the torque support is disposed in such a manner that an erection force acting substantially axially and counter to the tilting moment is provided so as to engage on the second housing, in particular in a radially outer force-engagement region on the housing of the transmission component that lies at a maximum outer position. The erection force is provided, for example, by a force pair on mutually opposite force-engagement regions which are radially outside as far as possible, so that also small motion tolerances can be compensated in an ideally precise manner and with a good lever arm, and optionally also be damped. "Axial" herein is also to be understood in the sense of the axial extent of the drive train.

According to one exemplary embodiment, the torque support comprises a (further) support unit which acts on the (first) housing of the mounting of the shaft and is disposed in such a manner that a force that acts substantially vertically (radially/tangentially), or in the circumferential direction, is provided so as to engage on the second housing. This not least enables an even greater functional integration into the torque support, in particular in terms of torques acting about the shaft or the drive train, and with a view of a respective positional tolerance, or else a damping action, which is potentially desired.

To this extent, the present invention also offers the torque support in a radial plane in the tangential direction, or in the circumferential direction (torque support in the manner of an internal bearer) and tilting support out of the radial plane (in the manner of an external bearer), in each case due to support on the massive rotor bearing housing, wherein the machine support lying below can be embodied so as to be less massive, or slimmer. The compensation of force herein can take place in a hydraulic manner, for example.

According to one exemplary embodiment, the second housing is disposed separately from the first housing and axially spaced apart from the latter. The housings are connected directly to one another, for example exclusively by means of the torque support described herein, and are also only indirectly connected by way of the respective mountings and shafts that are provided in the respective housing.

According to one exemplary embodiment, the transmission component is disposed between the shaft and a generator which engages on the second housing or on the transmission component (or on the weight of the latter). This type of connection in series in the drive train has proven advantageous for different applications, and according to the invention the support is also able to be advantageously implemented in the case of an additional generator flanged to the drive train, in particular exclusively by support on the first housing, thus without any further supports in the direction of the machine support. This enables a comparatively short/slim machine support not least also in the case of a generator disposed in series, and in this way also enables an advantageous distribution/concentration of force on the interface to the bearing housing.

One aspect of the invention furthermore relates to an industrial transmission having such a drive train mounting assembly, in particular in a disposal in the wind power installation.

The object mentioned above is to this extent also achieved by an industrial transmission, in particular with the planetary gear stage, having a drive train mounting assembly as described further above. The object mentioned above is to this extent also achieved by a wind power installation having an industrial transmission as described further above, or having such a drive train mounting assembly. Advantages which have been mentioned previously are derived as a result, in particular with a view to a functional mode of the respective transmission at significantly reduced external stresses and significantly reduced wear.

One aspect of the invention furthermore relates to a method for adjusting or adapting a mounting of a drive train mounting assembly of this type. The object mentioned above is to this extent also achieved by a method according to the corresponding coordinate method claim, specifically by a method for adjusting a mounting of a drive train mounting assembly of an industrial transmission, in particular in a drive train having a rotor with double mounting or momentum mounting, of a wind power installation, wherein a mounting of a shaft of the drive train which is supported in a first housing, and a transmission component (in particular planetary transmission stage) which is surrounded by a second housing and coupled to the shaft, are mounted in relation to one another, wherein supporting the second housing and thus the transmission component on the first housing, thus on the housing of the mounting of the shaft, is performed by means of a torque support that counteracts a gravity-induced torque which acts on the shaft by means of the transmission component, in particular in a drive train having a generator which is supported on the second housing, and accordingly also on the first housing, in particular in a drive train mounting assembly described further above, or in an industrial transmission, or in a wind power installation. In conjunction with the previously mentioned advantages, this also enables a more sustainable operating mode of dynamically highly stressed installations and industrial transmissions, for example in wind power installations.

An active force-controlled and/or path-controlled feedback-control of an erection force or supporting force which is exerted on the second housing and dissipated by way of the first housing, for example by way of a hydraulic activation, is performed by means of at least one adjustable unit acting between the first and the second housing, in particular based on momentary measured values of at least one force/path sensor and/order acceleration sensor installed in the drive train. This not least also facilitates a sustainable operating mode by adapting the type of support to momentary operating conditions.

According to one exemplary embodiment, vibration damping or vibration decoupling is performed on at least two mutually opposite circumferential positions in at least one coupling portion between interacting coupling parts by means of the at least one adjustable unit, in particular by means of at least one pre-tensioning unit per circumferential position. Depending on the specific application, a plurality of adjustable units can be implemented here, by means of which reactive force pairs acting about at least two, or about all three, torque axes, or acting in a three-dimensional manner about all three spatial directions, are provided and can optionally also be actively adjusted.

The object mentioned above is also achieved by the use of a drive train mounting assembly described further above in an industrial transmission, in particular in a wind power installation, in an arrangement between a/the rotor of the wind power installation and a/the generator of the wind power installation, in particular in a single-axis co-aligned arrangement/alignment, wherein tilting moments as well as torques are transmitted from a/the transmission housing of the drive train mounting assembly to a/the rotor bearing housing which is disposed on a shaft of the drive train by means of a/the torque support of the drive train mounting assembly, wherein the transmission housing and potential further components such as, for example a generator, flanged/coupled thereto is/are supported exclusively on the rotor bearing housing. Advantages which have been mentioned further above can be implemented as a result.

BRIEF DESCRIPTION OF THE FIGURES

The invention will be described in yet more detail by way of example by means of preferred exemplary embodiments in the following figures of the drawing, whereby the features illustrated hereunder can represent an aspect of the invention individually as well as in combination, and wherein reference to reference signs which are not explicitly described in a respective figure of the drawing is made to the other figures of the drawing. In each case in a schematic illustration.

DETAILED DESCRIPTION OF THE FIGURES

Figure 1A:
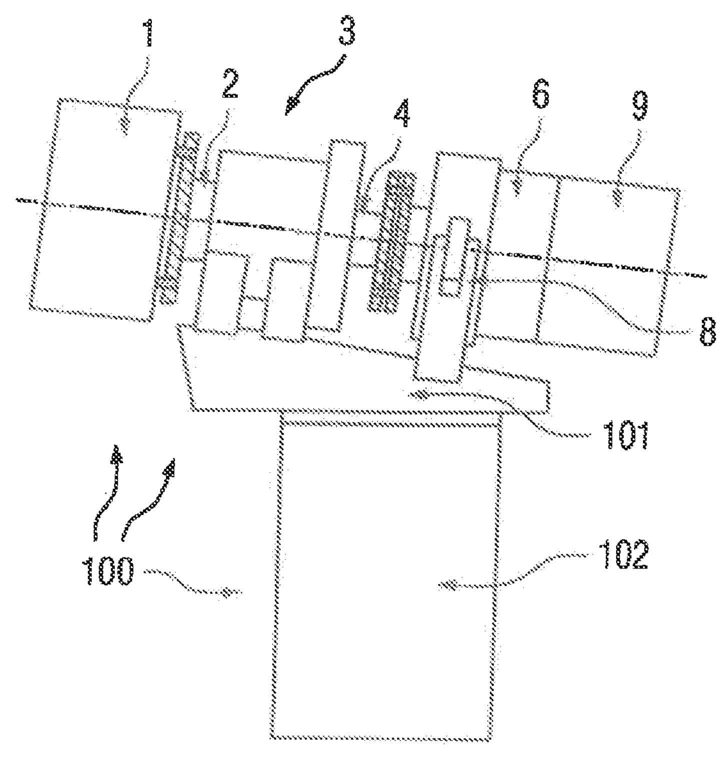
FIGS. 1A, 1B show a drive train having a support of the drive train according to the prior art in a lateral view and in a partially sectional lateral view.

First, the invention will be explained in general with reference to all reference signs and figures. Particularities or individual aspects of the invention, or aspects of the invention that are readily visible/visualizable in the respective figure, will be discussed individually in the context of the respective figure.

A drive train has the following components, for example: hub 1, shaft 2 (in particular rotor shaft of a wind power installation), rotor bearing housing 3, rotor bearing/rotor mounting 4 (in particular torque mounting or tapered roller mounting), coupling 5, transmission 6 in the transmission housing 7, torque support unit or weight support 8 with coupling to the base (machine support), and a generator 9. The structure of the drive train is heavily stressed in the context of high weights in the event of strong, also dynamic, forces, for example also generated by bending moments proceeding from a rotor of a wind power installation that is coupled to the shaft, even when the torque support unit, or weight support 8 is of a comparatively good design/size. Apart from the rotor shaft, the flanged connection to the planet carrier, the planet carrier bearings and the torque support, the machine support is also exposed to quite high stress in the process. In this context, it is a matter of interest to achieve an advantageous type of mounting of the drive train, which can positively receive and transmit stresses of this type.

Provided is a drive train mounting assembly 10, for example for an industrial transmission 20, having a shaft 2 which is supported in a rotor mounting 14 (here: double mounting, or torque mounting). The rotor mounting 14 is encased or surrounded by a rotor bearing housing 13 (first housing). A transmission component 16, in particular with a planetary gear stage, is disposed in a transmission housing 17 (second housing), and the shaft 2 interacts with this transmission component 16. A torque support 18 (torque and/or tilting moment support) is provided as a type of mechanical/hydraulic bridge between the two housings 13, 17, in particular on an connection (diameter) which lies radially outside as far as possible, wherein supporting takes place on the first housing 13, for example in the points P1, P2 illustrated. The support in the region P1 can advantageously also take place symmetrically but eccentrically, in particular also so as to ensure a supporting and/or damping function in the yawing direction (perpendicular to the tilting and axial direction, rotating movement about the tower axis).

The following components are in particular provided for the support on the first housing 13: traction member 13.5, tappet/cam 13.7.

The following components are in particular provided for the support on the second housing 17 (or the transmission of force from the second housing): radially projecting flange 17.1 or similar force-engagement collar or segment or tappet, individual force-engagement segment 17.3 (in particular lug or tab or web); traction member 17.5, tappet/cam 17.7.

The torque support 18 enables a force to be received and transmitted from the transmission housing 17 by way of the bearing housing 13 into a/the base 101. In the process, an erection force F1 which acts counter to the weight/gravity g on the transmission housing 17 is provided (in particular as a force pair about the central longitudinal axis, or shaft axis) in the manner of a restoring supporting moment M2 which acts counter to a/the tilting moment M1. Optionally, the torque support 18 can additionally also cause or provide or actively generate a supporting force F2 by means of which a/the torque M3 acting on the transmission component and transmitted to the transmission housing can be counteracted. The erection force F1 and the supporting force F2 can optionally also be actively feedback-controlled, for example based on momentary measured values of force/path sensors at the respective interface.

The torque support 18 preferably has at least one adjustable unit 18.1, in particular comprising: pre-tensioning unit 18.2 (in particular axial, in particular having at least one mechanical spring), support unit 18.3 (in particular annular or semi-/shell-shaped); diagonal connection 18.5, further support unit 18.6 (in particular annular or semi-/shell-shaped), further pre-tensioning unit 18.7, or at least one correspondingly installed decoupling element (in particular disposed in the radial plane and/or aligned in the circumferential direction).

The type of support can optionally be actively adjusted and also feedback-controlled. For this purpose, at least one force/path sensor 19 can optionally be provided, which can be connected to a control/feedback-control unit.

The drive train mounting assembly 1 described here offers the advantages described herein in a particularly noticeable manner in particular also in the case of a wind power installation 100, wherein a machine support or similar base 101 for the drive train is disposed on a tower 102.

The invention will yet be explained more specifically hereunder with reference to the individual figures.

Figure 1B:
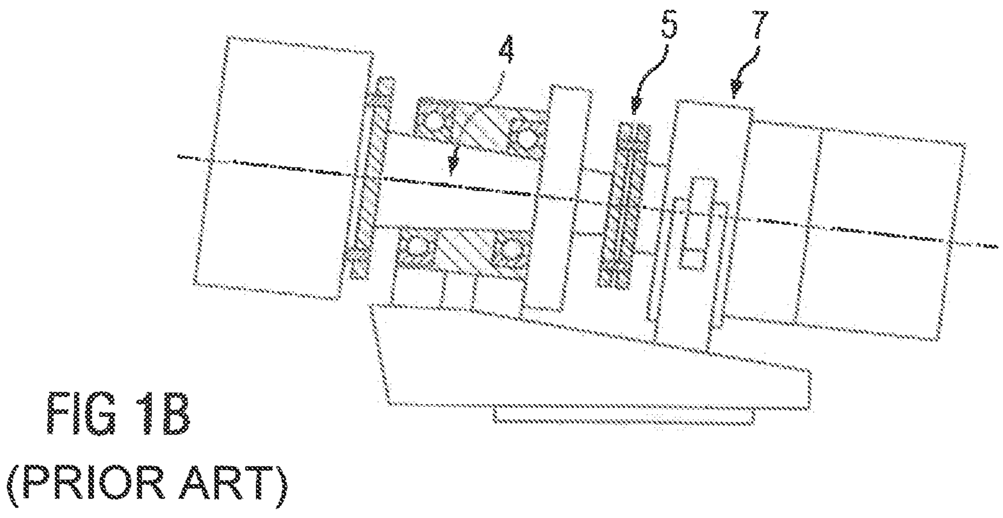

Illustrated in FIG. 1 is a known drive train assembly with reference to a wind power installation. A generator 9 is fastened to the transmission housing 7. The transmission housing is supported toward the bottom on the machine support 101 by way of a support unit 8 (torque and weight support). The rotor bearing housing 3 is shown in the lateral view in FIG. 1A, and the rotor bearing housing 3 is shown in a sectional lateral view in FIG. 1B. The rotor shaft 2 is comparatively massive, or large in diameter, and the rotor bearing 4 is supported in a comparatively robust manner by way of a rather large longitudinal portion on the machine support 101.

The weight of the transmission, and optionally of a generator flanged to the transmission housing, herein stress the rotor shaft, the rotor bearings, the planet carrier and in particular a/the first transmission stage, the planet carrier bearing thereof and the flanged connections between the rotor shaft and the transmission. Rotating bending is created in the rotating elements as a result, which has to be disadvantageously taken into account when sizing said rotating elements.

Figure 2:
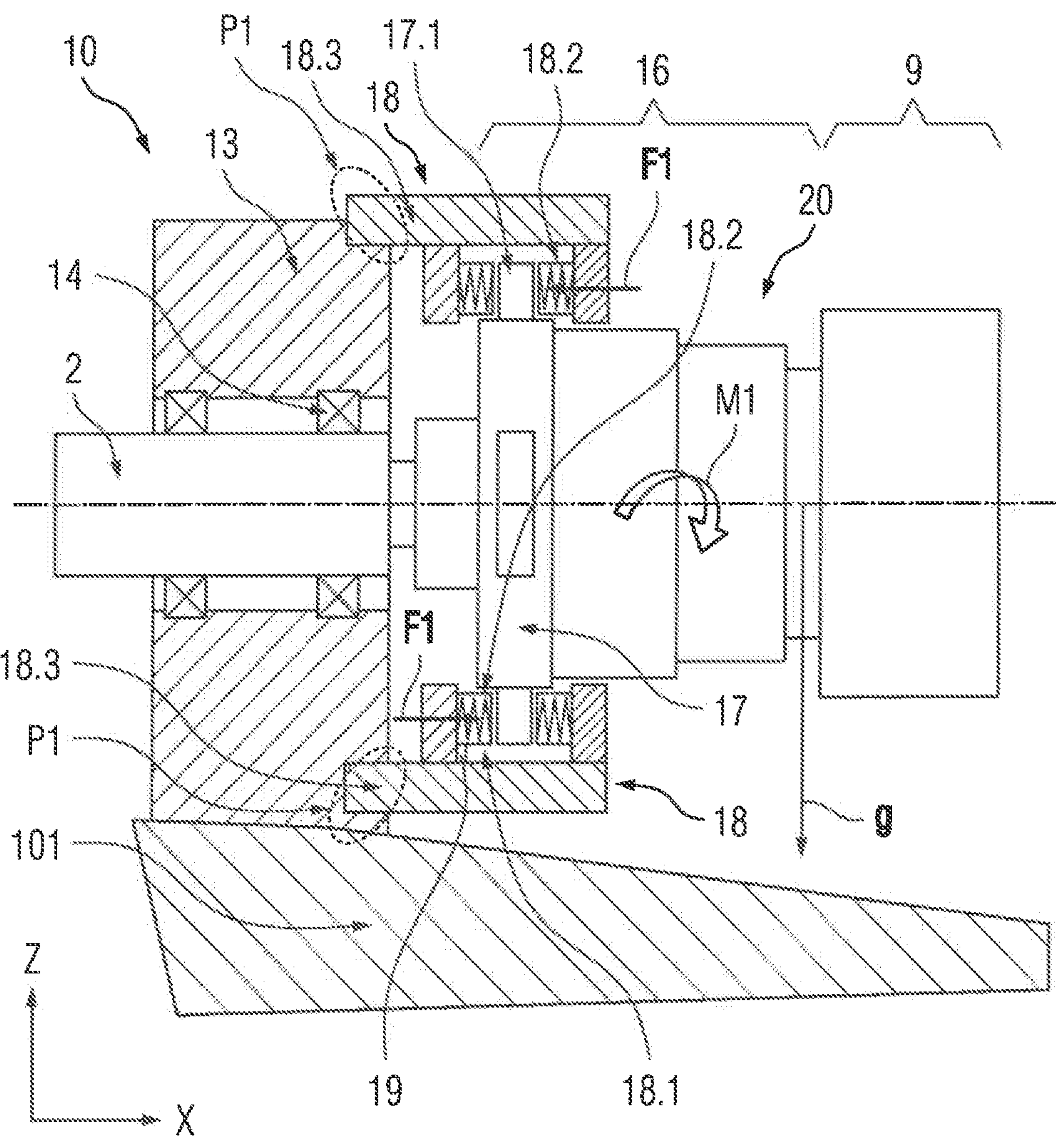
FIG. 2 shows a drive train mounting assembly according to a first exemplary embodiment, in particular for a rotor of a wind power installation, in a partially sectional lateral view.

A first exemplary embodiment of the drive train mounting assembly 10 is shown in FIG. 2. The force pair F1 generated on the flange 17.1 or corresponding radial appendages causes an erection force counter to a pitching/tilting moment M1. A predefined type of support or development of force, or else an active feedback-control can be selectively implemented by way of the adjustable unit 18.1, for example also based on momentary measured values of at least one force/path sensor 19 and/or of an acceleration sensor 21. The transmission of force and the support of the latter on the rotor bearing housing 13 can take place in particular in the regions or points P1. This support can advantageously also take place symmetrically but eccentrically, in particular so as to ensure a supporting and/or damping function also in the yawing direction (perpendicular to the tilting and axial direction, rotating movement about the tower axis), in particular in the case of at least one adjustable unit 18.1 being disposed therebetween, comprising at least one pre-tensioning unit 18.2 in at least one coupling portion between interacting coupling parts 17.1, 18.3. Active damping in the case of vibrations, for example about the pitching or yawing axis, can be generated in conjunction with data from at least one sensor (in particular data from the acceleration transducer 21), and/or said vibrations can be passively damped by elastic elements.

The rotating bending resulting from the weight of the transmission/generator combination can be significantly reduced by means of the assembly according to the invention for example for a wind power installation having a rotor shaft with double mounting, or torque mounting, and a transmission and generator linked thereto. According to the invention, the rotating bending stress can be significantly reduced, and at the same time tilting in the transmission, in particular in a/the first planetary gear stage, can be reduced; as a result, not least a better supporting behavior of the toothings can also be achieved as a result. Moreover, an improved force reflux with fewer negative effects resulting from a usually dissimilar deformation between the machine support and the drive train (transmission and the linkage of the latter to the rotor shaft unit) can be achieved by the transmission torque being supported by way of the rotor bearing housing, and also by a torque support of the transmission. The pitching moments, in particular resulting from wind loads (in wind power installations) to this extent do not have to be supported by way of the machine support and also do not lead to additional loads as a result. Thanks to the type of mounting/support according to the invention, oversizing of the affected machine elements (rotor shaft, rotor bearing, rotor shaft flange to the planet carrier, planet carrier, planet carrier bearing, transmission and generator housing flanges) can now also be dispensed with, as a result of which an advantage in terms of cost and weight can also be generated. To this extent, an additional support of the weight between the generator and the machine support is no longer required; a support structure for supporting the weight below the generator becomes dispensable; a pitching movement of the drive train can now be absorbed or damped by way of the bearing housing without unfavorable leverage forces or excessive loads which could affect the overall structure.

The bending moment which is induced on the transmission housing (torque support) by the mass of the transmission and optionally the mass of the generator can preferably be supported in relation to the rotor bearing housing by an adjustable unit, or by at least one adjustable element, which is/are preferably disposed at least in the upper region and/or the lower region of the interface between the transmission housing and the rotor bearing housing. In this way, the adjustable unit compensates the negative effect of the bending moment on the affected machine elements, and at the same time aligns the corresponding transmission components, for example a ring gear of a first planetary gear stage in relation to the planet carrier, and the process can also ensure a better supporting behavior in the toothings.

According to the invention, a force-fit can be established between the non-rotating housing parts of the transmission and of the rotor bearing housing. The weight bending moment created by the weight is compensated by an erection force, in particular by an erection force in the form of a force pair that engages on the transmission housing at the bottom and the top.

In a further function, an almost load-free axial movement along the rotor shaft axis can be generated or permitted in that the adjustable unit, or the at least one adjustable element thereof, is/are diagonally connected in such a way that the weight bending moment continues to be received by a force pair of identical size, without the axial movement being impeded. In the present context, in particular in the context with a hydraulic and/or mechanical (force or position) compensation, a diagonal connection can also be referred to as a comparatively soft support in the actual direction (depending on the inclination of the shaft at least approximately in the horizontal plane) and a comparatively stiff support in the vertical direction, or in the tilting direction. A direction of movement of the transmission relative to the shaft, or relative to the rotor bearing housing, which is caused by the force of gravity is to be understood in particular as the tilting direction herein; the tilting does not necessarily have to take place about an axis which is orthogonal to the shaft, but depending on the dynamic state may also be a multi-axis tilting/yawing movement.

The destressing in terms of the weight and thus of the rotating bending moment for the rotating parts that can be implemented by means of the assembly according to the invention, is preferably carried out in those regions of the drive train, for example of a wind power installation, that are anyway capable of or provided for receiving high loads and bending moments, for example resulting from wind loads. Any potential additional enhancement or reinforcement for ensuring the desired destressing in terms of weight and bending moment is therefore associated with a comparatively minor complexity and at best no disadvantages which potentially result from a dissimilar deformation behavior between the drive train on the machine support; however circumstances of this type are significantly less disadvantageous in the assembly according to the invention than in a known weight support below the generator.

Figure 3:
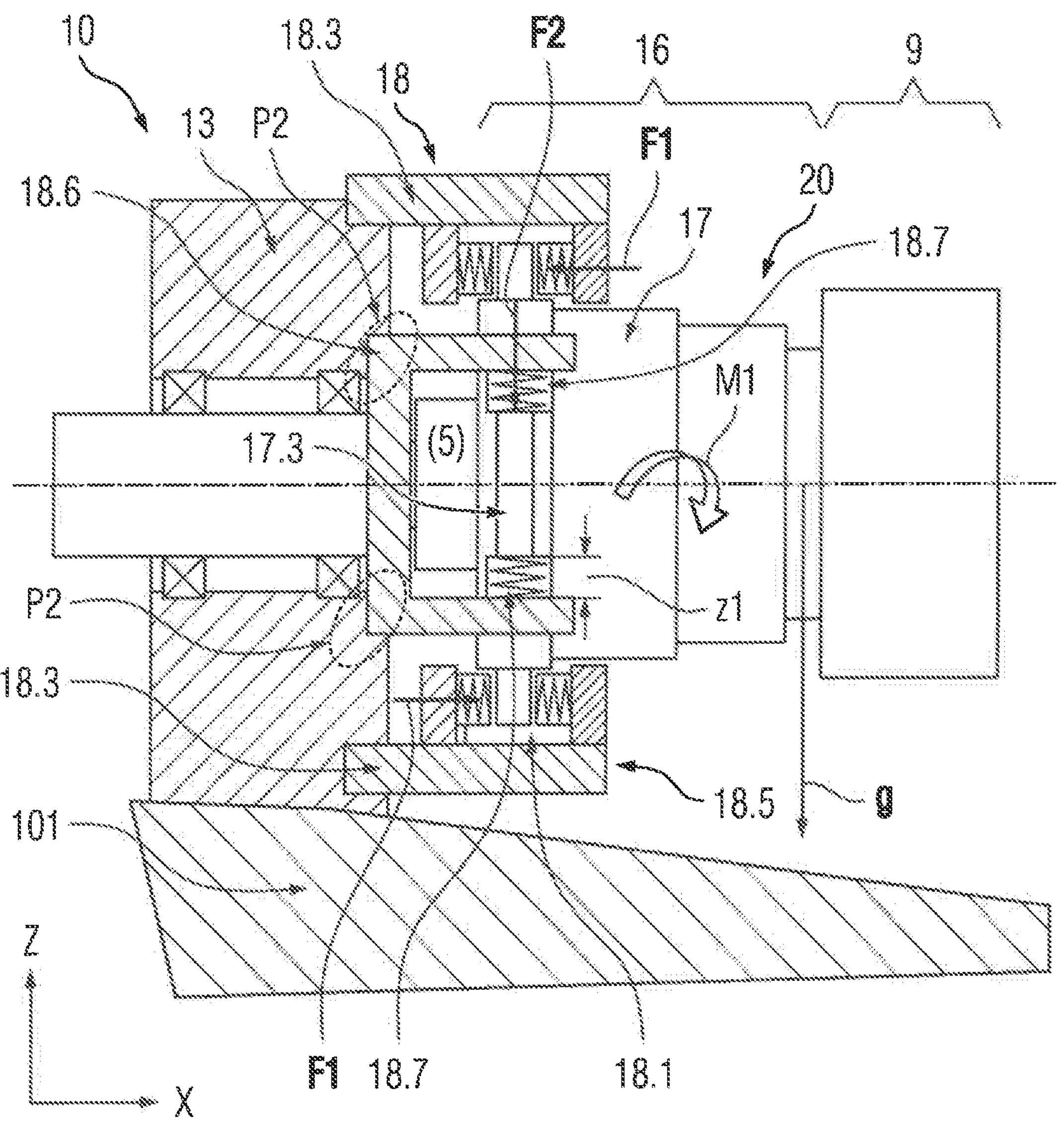
FIG. 3 shows a drive train mounting assembly according to a further exemplary embodiment, in particular for a rotor of a wind power installation, in a partially sectional lateral view.

A second exemplary embodiment of the drive train mounting assembly 10 is shown in FIG. 3, in which the torque support 18 also comprises a further support unit 18.6 which is supported on the first housing 13 in the regions or points P2 and by means of which a supporting force F2, which is aligned so as to be substantially vertical (radial/tangential), or in the circumferential direction and acts counter to a (drive) torque M3 can be exerted on the transmission housing (with the resultant supporting moment M2), in particular likewise provided by at least one force pair on at least approximately mutually opposite circumferential positions, in particular in the case of at least one adjustable unit disposed therebetween, comprising at least one pre-tensioning unit in at least one coupling portion between interacting coupling parts 17.3, 18.6. A predefined type of support or development of force, or else an active feedback-control can be selectively implemented by way of a/the corresponding adjustable unit 18.1, or by means of individual pre-tensioning or decoupling elements 18.7, for example also based on momentary measured values of at least one force/path sensor 19, can also be implemented in terms of this supporting force F2. The transmission of force takes place, for example, in each case between the rotor bearing housing and radially projecting flange portions 17.1 or similar force-engagement collars or segments or tappets on the transmission housing, or between the rotor bearing housing and individual force-engagement segments 17.3 on the transmission housing, in particular lugs or tabs or webs.

The at least one adjustable unit herein can ensure vibration damping at different circumferential positions for a/the force pair F1 which is aligned so as to be at least approximately axial (or parallel to the drive train axis or a rotation axis), as well as for a/the force pair F2 which is aligned so as to be at least approximately tangential/radial (thus orthogonal to the rotation axis), or a vibration damping implemented in the corresponding direction of action. The corresponding pre-tensioning and support units herein advantageously engage on circumferential positions at least approximately at 12 o'clock and 6 o'clock, as well as circumferential positions at least approximately at 3 o'clock and 9 o'clock (in particular diametrically opposite), or on four circumferential positions which are in each case offset by at least 90° in the circumferential direction, wherein the respective circumferential position can also be a circumferential segment or region of, for example, 10 to 15°, depending on the design embodiment of the corresponding coupling portion. A plurality of adjustable units are preferably provided, which each have an individual direction of action and spring/damper characteristic and are optionally also individually adjustable, controllable and/or feedback-controllable. This facilitates a highly individual situation-dependent response to momentary dynamic and also drive train-specific stresses in a plurality of spatial directions or even in all spatial directions.

In other words: in addition to the support unit/elements for the erection force, a further advantage can be achieved by means of the torque support, in that at least two further support elements, which act in the vertical direction and are likewise supported on the rotor bearing housing, are also used so as to be combined by means of the torque support. As a result of the rotor shaft being guided by way of the rotor shaft bearings in the rotor bearing housing, this additional support which in functional terms is to be described as a torque support is imparted the same relative movements as a transmission of torque support, and no additional loads resulting from the pitching loads of the rotor blades of the installation being received are created in the process. To this extent, such a functional integration in the torque support, or such a dual function of the torque support, offers a particularly slim design which is particularly tolerant in terms of forces/torques/movements.

The machine support (base) illustrated in FIGS. 2 and 3 herein can also be designed to be significantly shorter, or be significantly shortened in comparison to the axial extent customary to date in particular in wind power installations (no additional support point below the second housing/transmission housing or the generator); this is because the connection to the base can advantageously take place in the region of the rotor bearing housing (first housing), optionally exclusively there. This additional advantage is only visualized by way of example by the region of the machine support that is illustrated in dotted lines here. The connection of the machine support to a tower or a similar bearer lying therebelow can accordingly also be embodied in a slimmer manner. Also to this extent, the possibilities in terms of material savings described here increase exponentially in favor of a slim design.

A height tolerance mounting portion z1 is also indicated in FIG. 3; depending on the desired degree of freedom of movement, the freedom of movement in the vertical direction can be structurally restricted and/or be limited by counterforces generated actively and/or passively by pre-tensioning units or the like. The person skilled in the art can optimize this freedom of movement z1 individually depending on the specific application, in particular also in combination with an integrated damping function.

With reference to the different axes of action of torque, two differently adjustable units 18.1 may also be referred to in the exemplary embodiment according to FIG. 3, which are implemented for generating at least two different counter torques.

Figure 4A:
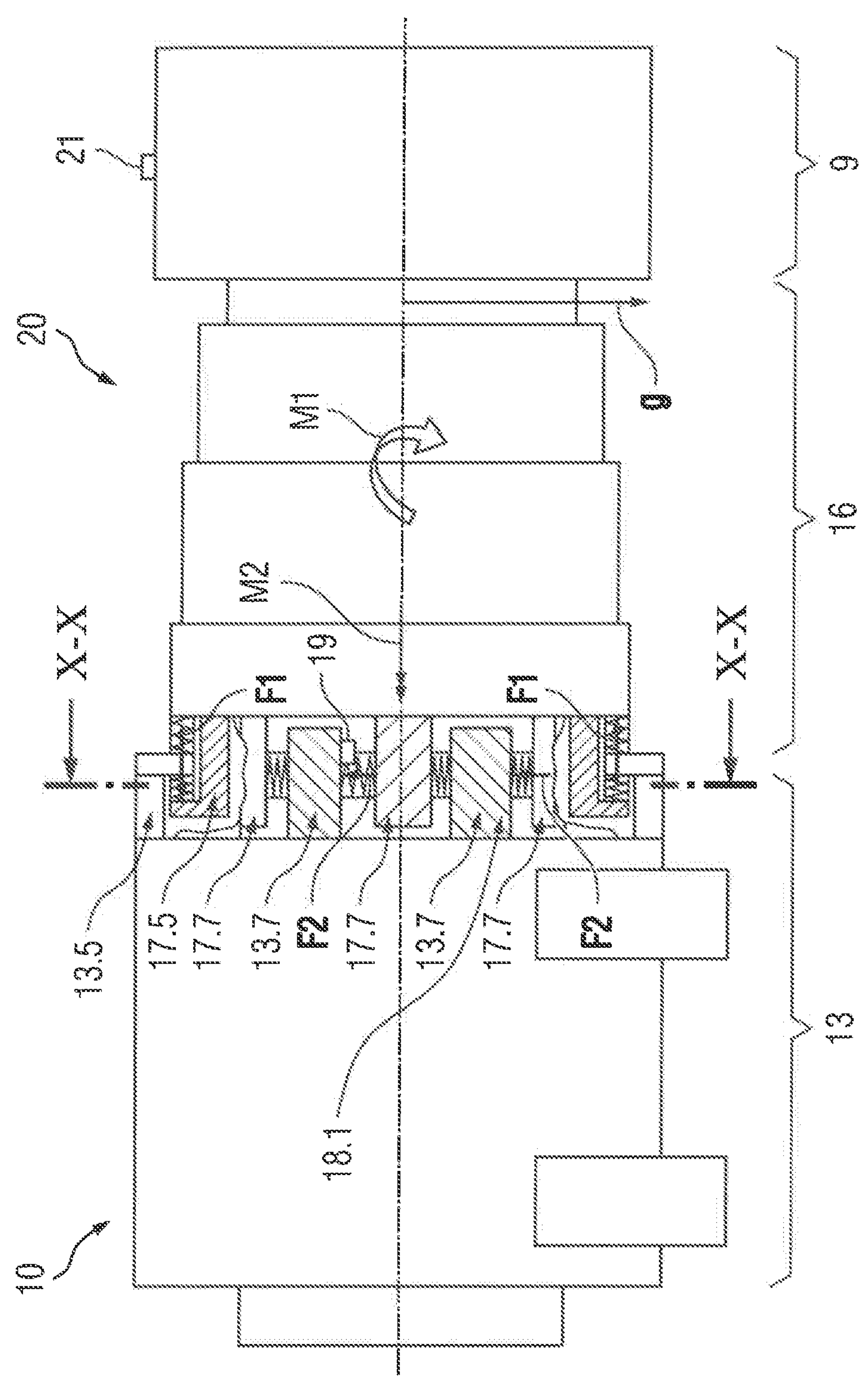
FIGS. 4A, 4B show a drive train mounting assembly according to a further exemplary embodiment, in particular for a rotor of a wind power installation, in a lateral view and in a sectional frontal view.
Figure 4B:
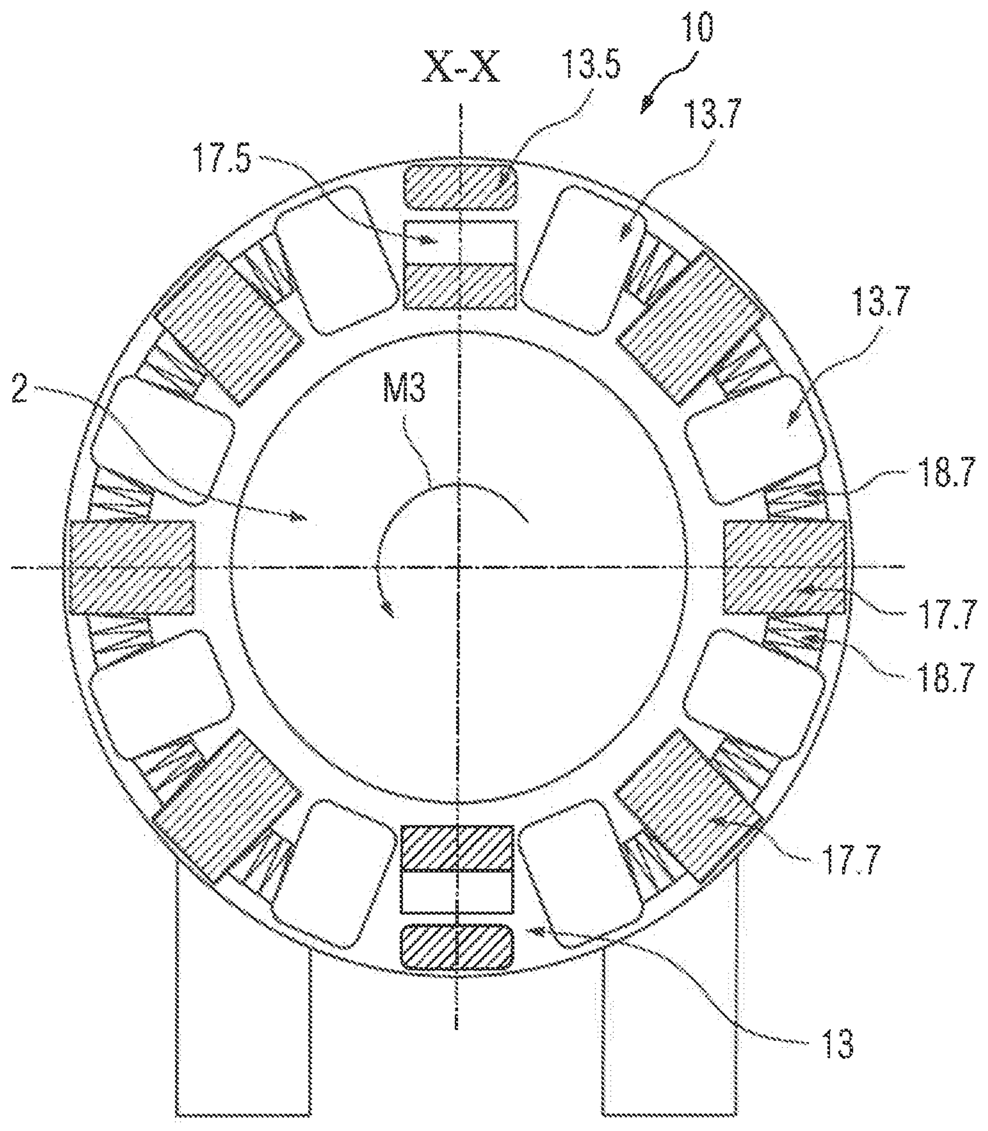

A further exemplary embodiment of the drive train mounting assembly 10 is shown in FIG. 4, in which the torque support 18 likewise comprises a tilting moment support as well as a torque support. The transmission of force takes place, for example, in each case between tappets 13.5 on the rotor bearing (housing) and tappets transmission (housing), or between traction members/cams 13.7 on the rotor bearing (housing) and tappets/cams 17.7 on the transmission (housing). The mutual engagement of the two housings 13, 17 in this exemplary embodiment can also be referred to/described as a type of claw coupling in which the two housings provide in each case one of the coupling partners, in particular in that the coupling elements or claws, or the tappets and traction member described further above, are formed in one piece so as to be integral on the respective housing. This not least also offers a high robustness and can avoid unnecessary relative movements or the loosening of parts. The mutually engaging traction members/cams of the two transmission housings are shown in FIG. 4A, and the exemplary distribution of the individual force transmission locations in the circumferential direction is illustrated in FIG. 4B, wherein six interfaces for the two different types of support or torque/force are in each case provided here in particular, thus repeating after each 60° in terms of a circumferential angle. The traction members can in particular also be advantageously positioned symmetrically but eccentrically; a supporting and/or damping function in the yawing direction (perpendicular to the tilting and axial direction, thus in the sense of a rotating movement about the tower axis) can also be advantageously ensured as a result, so that the planet carrier bearings are in particular also destressed in the case of vibrations, for example in the yawing direction.

With reference to the different axes of action of torque, at least two different adjustable units 18.1 may also be referred to in the exemplary embodiment according to FIG. 4, which are implemented for generating at least two different counter torques.

Figure 5A:
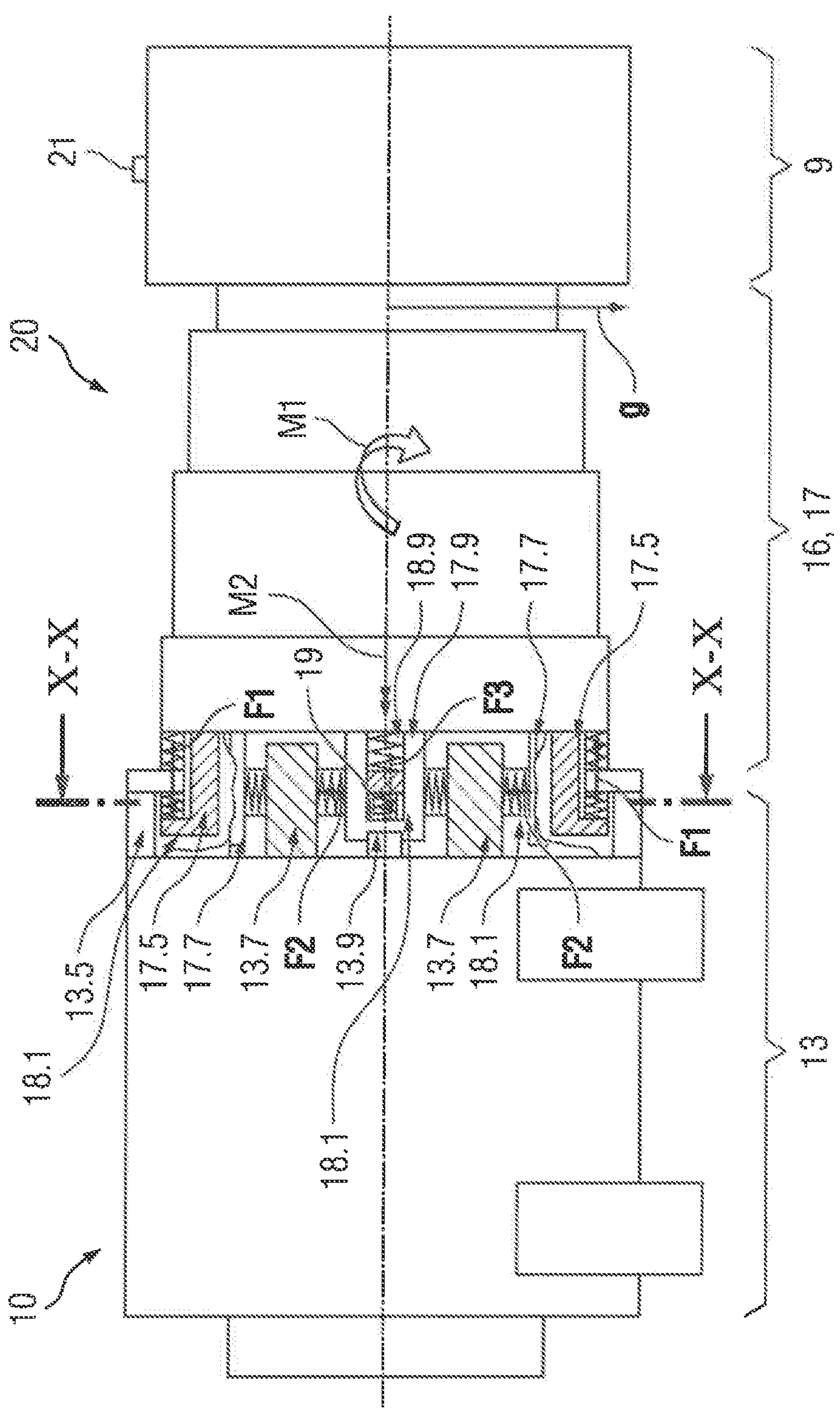
FIGS. 5A, 5B show a drive train mounting assembly according to a further exemplary embodiment, in particular for a rotor of a wind power installation, in a lateral view and in a sectional frontal view.
Figure 5B:
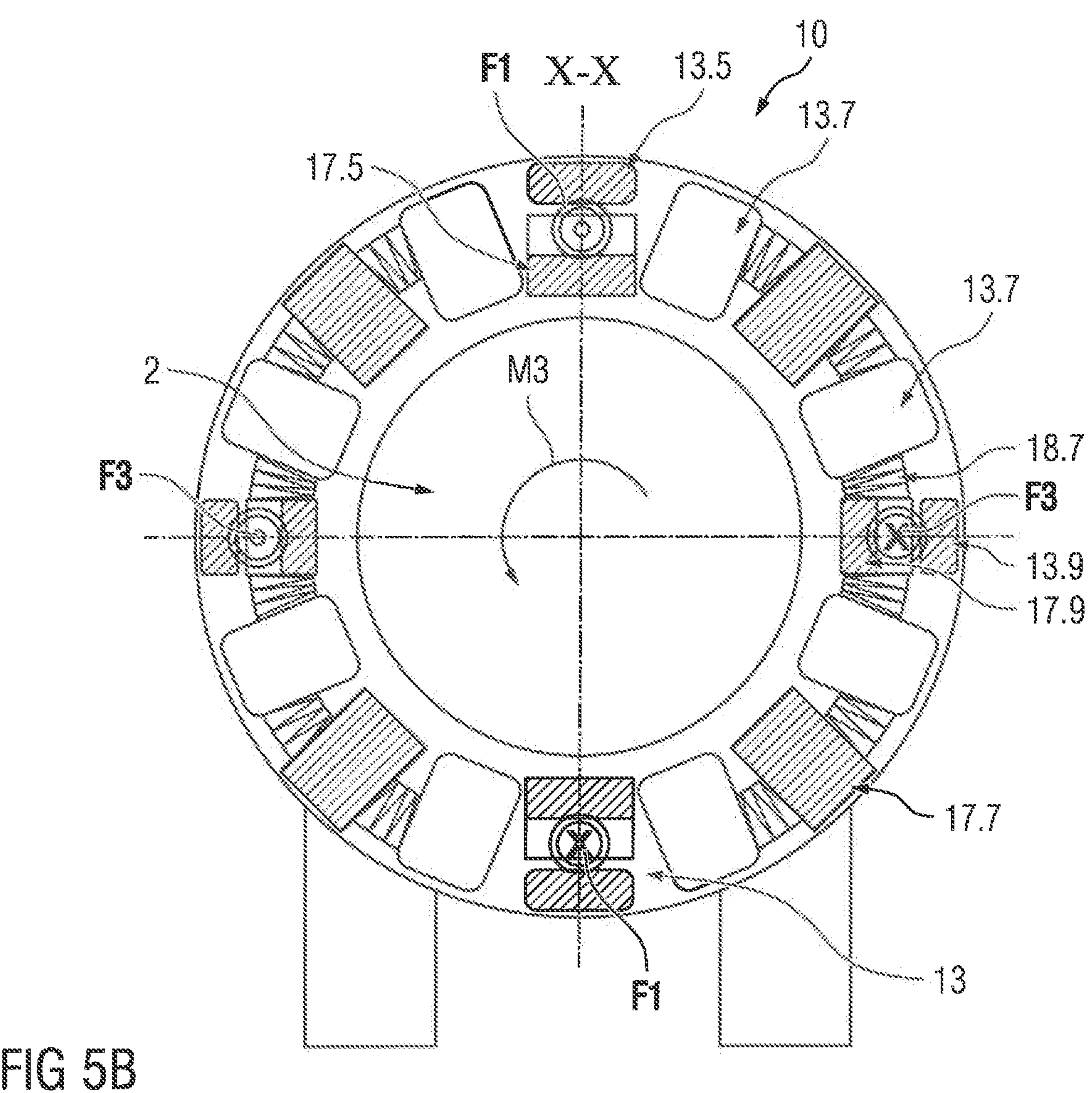

A further exemplary embodiment of the drive train mounting assembly 10 is shown in FIG. 5, in which the scope of functions of the torque support not only comprises a tilting moment support but also a yawing moment support which is particularly effective in the implementation shown. This type of support enables the absorbing and damping of vibrations, for example about the tower axis (yawing axis), in a particularly effective manner. Likewise, the adjustable unit 18.1 in an effective arrangement in the 12 o'clock and 6 o'clock position, respectively, can be effectively utilized to absorb and to damp vibrations, for example about the pitching/tilting axis. The corresponding mutually engaging traction members/cams 13.7, 17.7 of the two housings are shown in FIG. 5A (comparable to the housing coupling parts already explained in the context of the previous exemplary embodiments), moreover the traction members 13.5, 17.5 and the lateral traction members/compression members 13.9, 17.9 are shown in two planes which are aligned so as to be at least approximately mutually orthogonal, cf. also FIG. 4B. An exemplary distribution of the individual force transmission locations in the circumferential direction is illustrated in FIG. 5B, wherein the multiple e functionality of the lateral traction members/compression members 13.9, 17.9, which are preferably eccentric to the maximum, is particularly shown here, specifically as respective force transmission locations in the circumferential direction as well as in the axial direction. In other words: in addition to the components of the at least one adjustable unit 18.1 which have been described further above, the assembly 10 can also comprise the following further components, in particular in each case as a constituent part of a/the respective adjustable unit 18.1: lateral traction members/compression members 13.9 of the rotor bearing housing, in particular in the region of 3 o'clock and 9 o'clock, lateral traction members/compression members 17.9 of the transmission housing, in particular in the region of 3 o'clock and 9 o'clock, a further pre-tensioning unit 18.9, or at least one correspondingly aligned decoupling element, in particular axially aligned. As a result, a yawing force F3 can be counteracted in a particularly effective manner. Side note: the force F3 according to the implementation shown is indeed a force which is aligned substantially in the axial direction, like the force F1, but is here nevertheless provided with another reference sign because the corresponding reactive force pair generates a counter torque about another axis than a/the reactive force pair according to the force-engagement points of the forces F1. In this sense, with reference to the different axes of action of torque, reference may also be made to at least three different adjustable units 18.1 which are implemented in the exemplary embodiment according to FIG. 5.

It is to be mentioned that a yawing moment support does not necessarily have to take place in the manner according to the exemplary embodiment of FIGS. 5, but can already be implemented when the traction members 13.5, 17.5 described in the context of FIG. 4 are disposed, for example, so as to be slightly eccentric, thus disposed laterally eccentrically in a horizontal plane, on both sides of the central vertical axis of the drive train, or of the shaft 2. However, the exemplary embodiment described in FIG. 5 offers, or enables, more effective damping in particular by virtue of the larger effective lever arm. To this extent, a circumferential position which deviates from the circumferential position illustrated in each case in the figures can also be implemented for the traction members 13.5, 17.5. The lateral traction members/compression members 13.9, 17.9 which are in each case eccentric as far as possible, are nevertheless provided with another reference sign here, because a transmission of torque should also be able to take place in the circumferential direction on these members, cf. the force arrows F2 in FIG. 5A.

The invention claimed is:

1. A wind power installation, comprising:

a first housing encompassing a drive train mounting assembly and a shaft of the drive train supported in a mounting and defining an axial direction;

a second housing separate from the first housing and encompassing a transmission component having a planetary gear stage that is coupled to the shaft, an actively adjustable torque support fastened to the first housing and comprising a plurality of actively adjustable units configured to provide force pairs of mutually opposing forces acting at least in the axial direction;

wherein a first end of the second housing is connected via the actively adjustable units to the first housing and a second free end of the second housing is constructed as a cantilever supporting a generator and requiring no additional support; and a sensor selected from at least one of a force sensor, a path sensor, and an acceleration sensor installed in the drive train, with the actively adjustable units controlling the actively adjustable torque support in response to signals received from the sensor;

wherein the force pairs of opposing forces counteract a gravity-induced tilting torque exerted on the shaft by the transmission component.

2. The wind power installation of claim 1, wherein the adjustable unit comprises at least one circumferential opposing position pair at 3 and 9 o'clock or at 6 and 12 o'clock positions and is designed in at least one of two ways, a first way in which the adjustable unit generates on the at least one circumferential position pair a first force pair which is substantially axially aligned about an axial center of the drive train and is designed to counter tilting or yawing moments, and a second way in which the adjustable unit generates on the at least one circumferential position pair a second torque-generating force pair which is substantially radially aligned and acts orthogonally in relation to the axial center of the drive train to counter torques.

3. The wind power installation of claim 1, wherein the adjustable unit comprises a pre-tensioning unit per circumferential position designed to ensure on at least two mutually opposite circumferential positions vibration damping or vibration decoupling between interacting coupling parts in at least one coupling section.

4. The wind power installation of claim 2, wherein the adjustable unit is designed to act on at least two mutually opposite predefined circumferential position pairs in a resilient or damping manner between traction members or tappets of the first and second housings.

5. The wind power installation of claim 1, wherein the torque support is supported exclusively on the first housing, independently of any connection to a machine support or similar base disposed below the drive train or below the drive train mounting assembly.

6. The wind power installation of claim 1, wherein the torque support is supported on the first housing in support regions disposed along an outer connection diameter between the first housing and the second housing or wherein at least one of the first housing and the second housing is designed to provide at least partially at least one coupling partner for a mutual support of the first and second housings on one another.

7. The wind power installation of claim 1, wherein the adjustable unit is designed for adjustment of at least one of force, direction of action and force-engagement point/region.

8. The wind power installation of claim 1, wherein the adjustable unit of the torque support is provided in at least one of an upper region and a lower region of an interface between the first and second housings and is diagonally connected to provide a hydraulic or mechanical compensation that is stiffer in a tilting direction than in an axial direction.

9. The wind power installation of claim 1, further comprising a radially projecting flange or force-engagement collar or segment, which is provided on the second housing and delimited or encompassed on an axial position by the torque support.

10. The wind power installation of claim 1, wherein the torque support is disposed to provide an erection force acting axially and countering a tilting moment on the second housing; or wherein the torque support is disposed to provide a supporting force which acts axially but symmetrically off-center and counteracting a yawing moment on the second housing.

11. The wind power installation of claim 1, wherein the torque support comprises a support unit which acts on the first housing and is disposed in such a manner that a force that acts substantially vertically or in a circumferential direction is provided so as to engage on the second housing.

12. The wind power installation of claim 1, wherein the transmission component is disposed between the shaft and the generator which engages on the transmission component.

13. A method for compensating a gravity-induced tilting torque exerted by a transmission component on a shaft of a drive train-defining an axial direction of a wind power installation, the method comprising:

supporting the shaft of the drive train via a mounting in a first housing;

fastening to the first housing an actively adjustable torque support comprising a plurality of actively adjustable units designed to provide force pairs of mutually opposing forces acting at least in the axial direction in response to signals received from a sensor;

surrounding the transmission component having a planetary gear stage by a second housing separate from the first housing and coupling the transmission component with the planetary gear stage to the shaft;

supporting a generator on the second housing; wherein the actively adjustable torque support counteracts the gravity-induced tilting torque.

14. The method of claim 13, further comprising providing vibration damping or vibration decoupling on at least two mutually opposite circumferential positions in at least one coupling portion between interacting coupling parts by the adjustable unit.

15. The method of claim 13, wherein the active force-controlled or path-controlled feedback-control of the erection force or supporting force is established by the adjustable unit based on momentary measured values of at least one of a force sensor, a force sensor, and an acceleration sensor installed in the drive train.

* * * * *